US008265692B2

(12) United States Patent
Fish

(10) Patent No.: US 8,265,692 B2
(45) Date of Patent: Sep. 11, 2012

(54) BRACELET FOR COMMUNICATING WITH A MOBILE DEVICE

(76) Inventor: Peter Alan Fish, Killara (AU)

(*) Notice: Subject to any disclaimer, the term of this patent is extended or adjusted under 35 U.S.C. 154(b) by 39 days.

(21) Appl. No.: 12/897,580

(22) Filed: Oct. 4, 2010

(65) Prior Publication Data
US 2011/0319024 A1 Dec. 29, 2011

(51) Int. Cl.
H04B 1/38 (2006.01)

(52) U.S. Cl. .................. 455/556.1; 455/575.1

(58) Field of Classification Search .............. 455/556.1, 455/66.1, 90.3, 557, 575.1, 550.1
See application file for complete search history.

(56) References Cited

U.S. PATENT DOCUMENTS

| | | | |
|---|---|---|---|
| 4,754,285 A * | 6/1988 | Robitaille | 343/718 |
| 4,803,487 A * | 2/1989 | Willard et al. | 340/7.54 |
| 4,847,818 A * | 7/1989 | Olsen | 368/10 |
| 5,008,864 A * | 4/1991 | Yoshitake | 368/10 |
| 5,239,521 A * | 8/1993 | Blonder | 368/10 |
| 5,305,181 A * | 4/1994 | Schultz | 361/679.03 |
| D351,106 S * | 10/1994 | Frazier | D10/32 |
| 5,381,387 A * | 1/1995 | Blonder et al. | 368/10 |
| 5,467,324 A * | 11/1995 | Houlihan | 368/10 |
| 5,499,292 A * | 3/1996 | Blonder et al. | 379/433.1 |
| D369,751 S * | 5/1996 | Boyer et al. | D10/31 |
| 5,564,082 A * | 10/1996 | Blonder et al. | 455/575.6 |
| 5,659,611 A * | 8/1997 | Saksa | 379/433.1 |
| 5,796,354 A * | 8/1998 | Cartabiano et al. | 341/22 |
| 5,819,183 A * | 10/1998 | Voroba et al. | 455/570 |
| D402,654 S * | 12/1998 | Consolo | D14/144 |
| 5,889,737 A * | 3/1999 | Alameh et al. | 368/204 |
| D407,654 S * | 4/1999 | Rayon | D10/31 |
| 5,929,771 A * | 7/1999 | Gaskill | 340/7.54 |
| 5,987,310 A * | 11/1999 | Gray | 455/575.6 |
| 6,155,841 A * | 12/2000 | Spanyar | 439/37 |
| 6,285,757 B1 * | 9/2001 | Carroll et al. | 345/619 |
| 6,314,184 B1 * | 11/2001 | Fernandez-Martinez | 379/433.1 |
| D462,336 S * | 9/2002 | Chaiken et al. | D14/138 R |
| 6,567,523 B1 * | 5/2003 | Ghassabian | 379/433.1 |
| D482,671 S * | 11/2003 | DiDonato | D14/144 |
| 6,748,281 B2 * | 6/2004 | Alsio | 700/83 |
| 6,754,069 B2 * | 6/2004 | Harada | 361/679.03 |
| 6,859,657 B1 * | 2/2005 | Barnard | 455/575.6 |
| 6,882,870 B2 * | 4/2005 | Kivela et al. | 455/567 |
| 6,912,287 B1 * | 6/2005 | Fukumoto et al. | 381/151 |
| 6,957,049 B1 * | 10/2005 | Takeda | 455/90.3 |
| 7,257,422 B2 * | 8/2007 | Loprete | 455/550.1 |

* cited by examiner

Primary Examiner — Lewis West
(74) Attorney, Agent, or Firm — Amster, Rothstein & Ebenstein LLP

(57) ABSTRACT

A wristband wirelessly connects to a mobile phone allowing a user to talk on the mobile phone by using the wristband. The wristband includes a transmitter/receiver, a speaker and a microphone. The transmitter/receiver wirelessly pairs with the mobile phone. When the mobile phone receives an incoming call, a signal is sent to a vibrator housed within the transmitter/receiver and causes the wristband to vibrate. To connect to the call, a user can push a button located on the wristband or stretch the speaker piece and place the speaker in between his/her fingers. To disconnect from the call, the user can push the button or alternatively, release the speaker piece from in between his/her fingers which automatically triggers the transmitter/receiver to disconnect from the call.

11 Claims, 21 Drawing Sheets

BRACELET FOR COMMUNICATING WITH A MOBILE DEVICE

CROSS-REFERENCE TO RELATED APPLICATION

The application claims priority from Australian Innovation Patent No. 2010100675, filed Jun. 28, 2010, Australian Innovation Patent No. 2010100685, filed Jun. 30, 2010, Australian Innovation Patent No. 2010100824, filed Aug. 2, 2010, and U.S. patent application Ser. No. 12/684,265, filed Jan. 8, 2010, all of which are fully incorporated herein by reference.

FIELD OF THE INVENTION

The present invention relates generally to the field of wireless communication devices, such as a wristband housing a speaker and a microphone, that communicate wirelessly with other devices using Bluetooth™ technology.

BACKGROUND OF THE INVENTION

Wireless transmitting and receiving devices using Bluetooth™ technology allow users to talk on mobile phones without the inherent problems associated with the fixed length cords of wired devices (e.g. tangling). A typical Bluetooth™ headset device, for example, can be inserted into a user's ear allowing the user to communicate "hands-free" via a mobile phone. Many users are happy with the freedom of Bluetooth™ devices, such as headsets; however, some users find that a permanent device inserted into one's ear is uncomfortable and not fashionable.

Recent scientific studies have expressed health concerns for users of both transmitter/receiver devices, especially when being held close to a user's head, and mobile phones, especially when the phone is held against the user's head for an elongated period of time. These health concerns may be tied to the fact that cellular phones and Bluetooth™ transmitter/receiver devices both emit electromagnetic radiation which may cause health problems. Children are of particular concern, as their skulls and brain are still developing, and they often spend many hours talking on mobile phones.

Accordingly, there exists a need for a stylish, wireless transmitter/receiver device that can be comfortably worn by a user allowing the user to wirelessly access his/her mobile phone device. There also exists a need for a retractable speaker unit, separated from the transmitter by use of a fixed tethered cord or stretching of material housing the speaker, that provides a comfortable, convenient and fashionable way for a user to use a mobile phone while significantly reducing exposure to radiation levels that are emitted by mobile phones.

SUMMARY OF THE INVENTION

According to one embodiment, a piece of jewelry that can be worn by a user, such as a bracelet, houses a transmitting and receiving device. In one embodiment, the bracelet itself can be made from an elastic material. The bracelet houses a speaker unit, placed in a separate position from a transmitter, that is adapted to stretch along a portion of the elastic bracelet when in a stretched position. In another embodiment, the bracelet can be made from a stretchable, coiled cord.

In yet another embodiment, a retractable speaker unit can be provided, separate from the transmitter/receiver, which can be expanded and retracted from the bracelet. In another embodiment, the retractable speaker unit can embedded in the transmitter. In another embodiment, the expanding and retracting of the speaker unit on a cord controls functions such as connecting to and disconnecting from a call. In yet another embodiment, pushing a button controls functions such as connecting to an incoming call and disconnecting from a call. In a further embodiment, the transmitter/receiver can be set to automatically connect to an incoming call after a predetermined amount of time and/or a predetermined number of rings.

These and other features of this invention are described in, or are apparent from, the following detailed description of various exemplary embodiments of this invention.

BRIEF DESCRIPTION OF THE DRAWINGS

Exemplary embodiments of this invention will be described with reference to the accompanying figures.

DETAILED DESCRIPTION OF THE EXEMPLARY EMBODIMENTS

FIGS. 1-15 illustrate the bracelet device adapted to wirelessly connect to a mobile device, according to exemplary embodiments of the present invention.

Figure 1A:
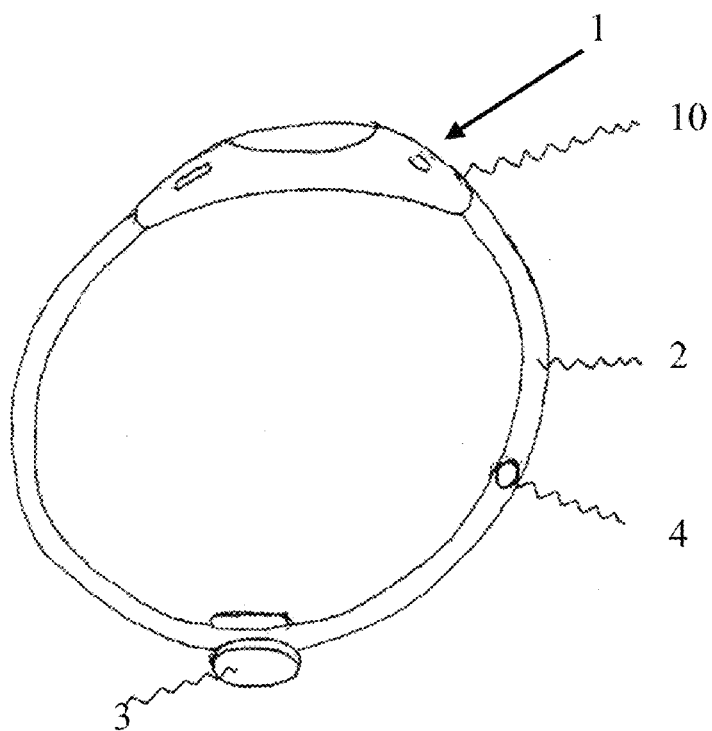
FIG. 1A is a front view of the bracelet device in a single loop according to an exemplary embodiment of the present invention.

As shown in FIG. 1A, a wristband 2 made from elastic material includes an earpiece housing a speaker unit 3 tethered in a first position. The wristband 2 also includes a wireless transmitter/receiver 10 tethered in a separate, second position, for example, at an angle 180°, from the speaker unit 3. The wireless transmitter/receiver 10 may include a vibrating unit or vibrator (not shown) located in the casing of the wireless transmitter/receiver 10. The vibrator can be a 3 volt Hopel vibrator (D8*5 mm), for example. The vibrator can be adapted to alert the user of an incoming call. The bracelet device may also contain a digital display to alert the user of incoming phone calls. The wireless transmitter/receiver 10, the speaker unit 3 and a microphone 4 (described in detail below) are coupled together by a bus or a wire to form a single unit housed inside or along the wristband 2.

Figure 2A:
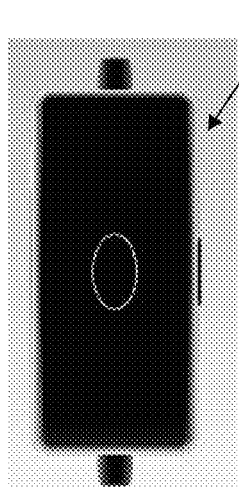
FIGS. 2A-2J illustrate various views of a transmitter/receiver in accordance with one embodiment of the present invention.
Figure 2B:
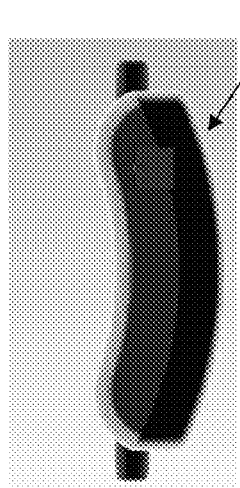
Figure 2C:
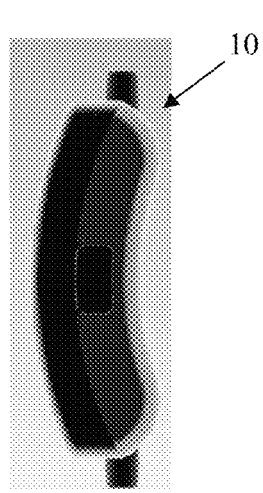
Figure 2D:
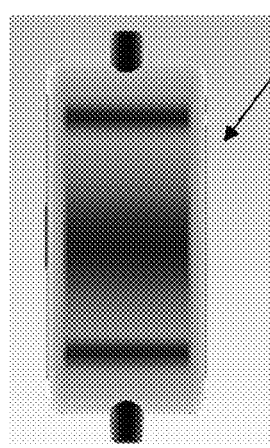
Figure 2E:
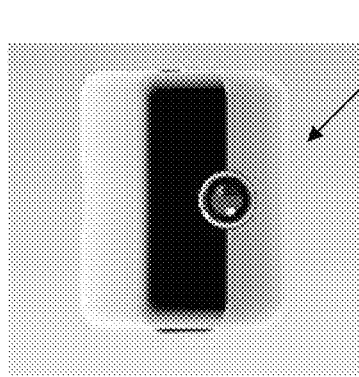
Figure 2F:
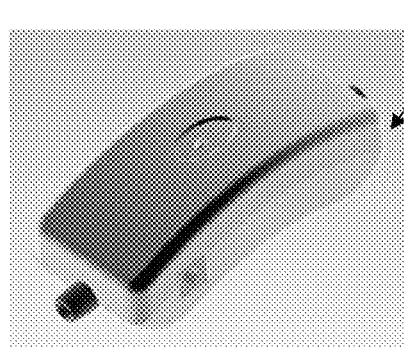
Figure 2G:
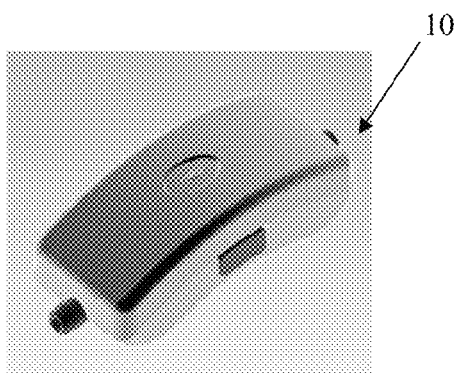
Figure 2H:
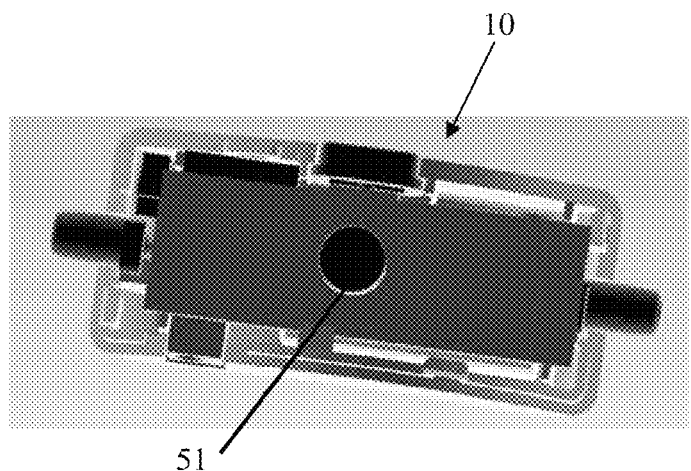
Figure 2I:
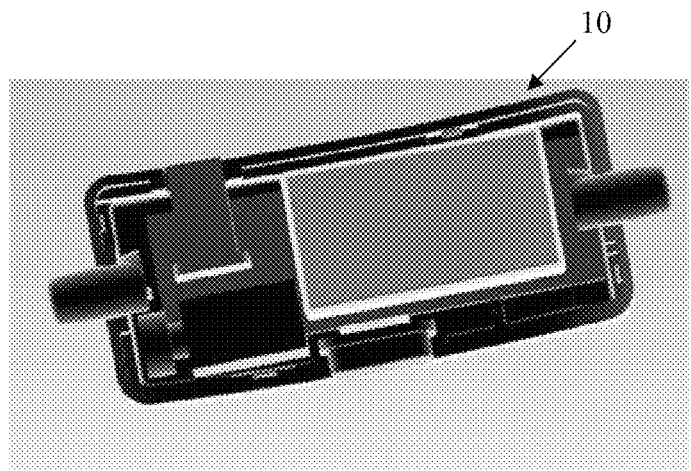
Figure 2J:
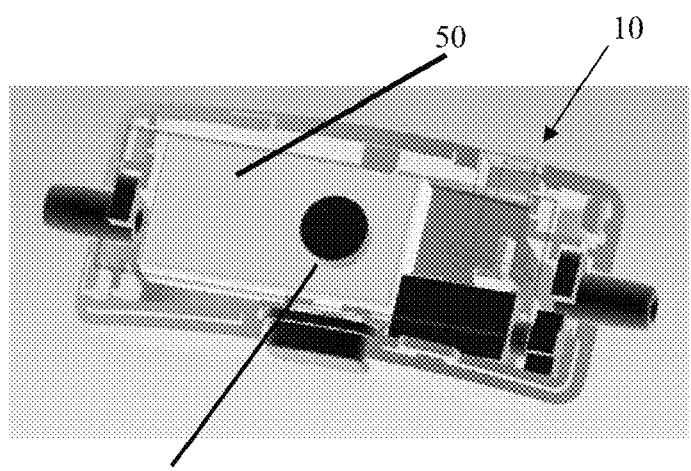
Figure 3:
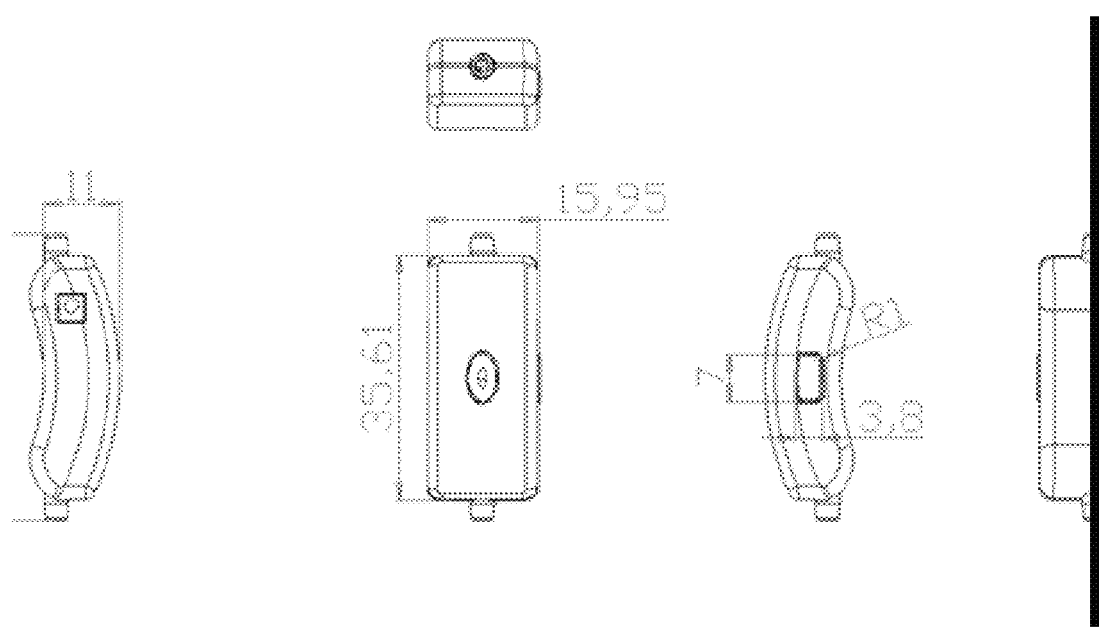
FIG. 3 illustrates a blueprint of the transmitter/receiver in accordance with one embodiment of the present invention.

Various views of transmitter/receiver 10 are illustrated in FIGS. 2A-2J. Although this figure illustrates the transmitter/receiver 10 housed within the elastic wristband, it is understood this transmitter/receiver can be housed within any of the wristbands or bracelet devices described in this invention or any wristbands as known in the art. FIG. 2J illustrates the uncovered, underside of the transmitter/receiver showing a battery unit 50 and a button 51. The battery may be, for example, a Juheyuan S2, S3 or J1 battery having a charge of 35 mAH (milliampere-hour), 35 mAH or 50 mAH, respectively. FIG. 3 illustrates a blueprint of the transmitter/receiver showing the unit number measurements of the various components.

Figure 4A:
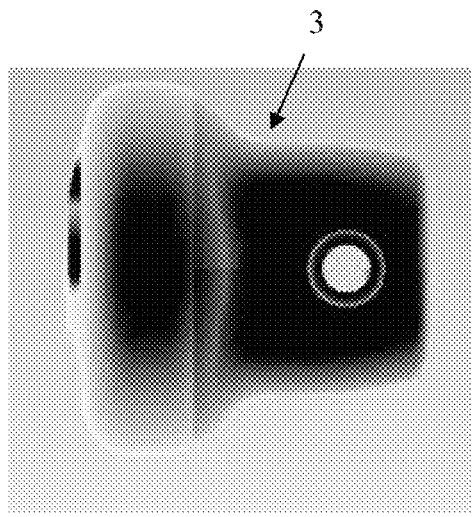
FIGS. 4A-4E illustrate various views of the speaker unit in accordance with one embodiment of the present invention.
Figure 4B:
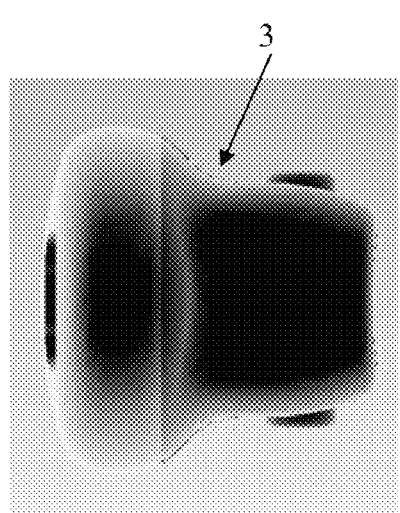
Figure 4C:
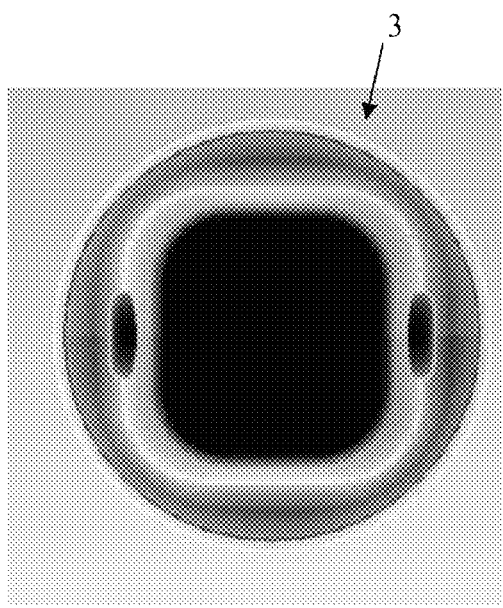
Figure 4D:
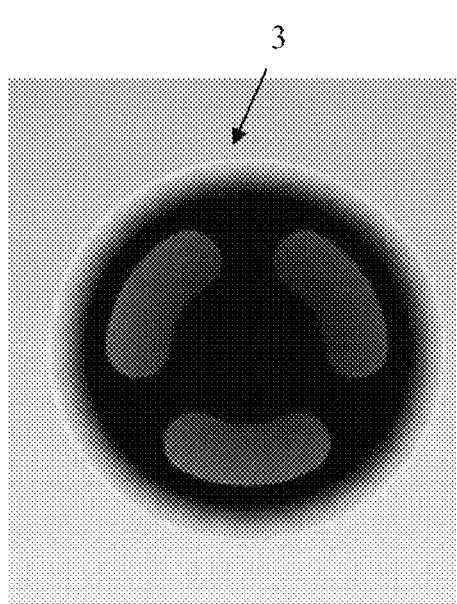
Figure 4E:
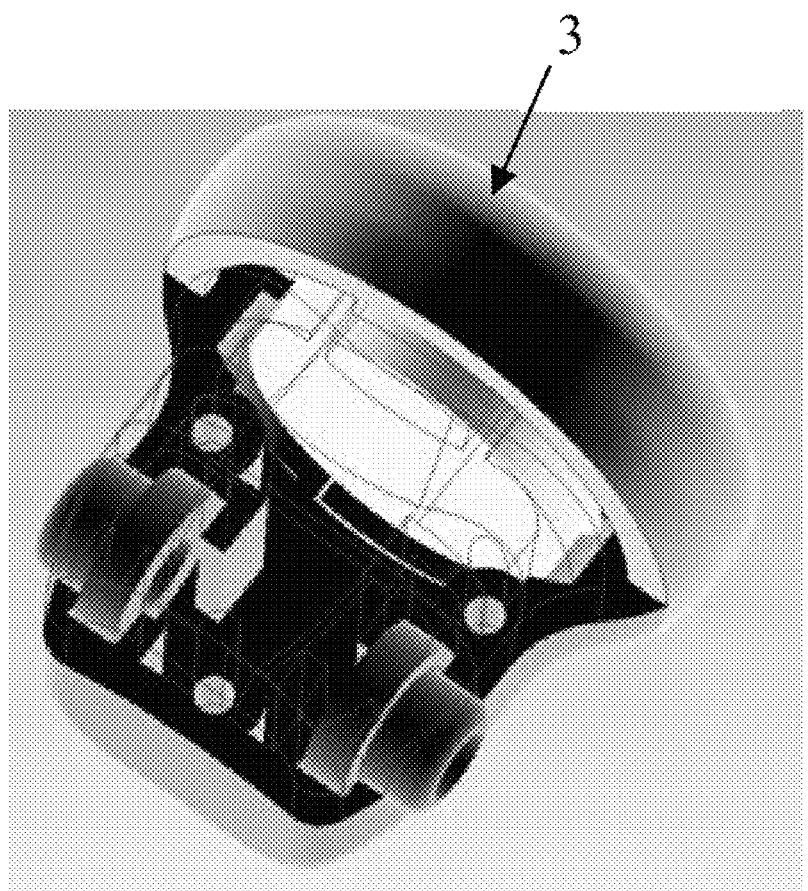
Figure 5:
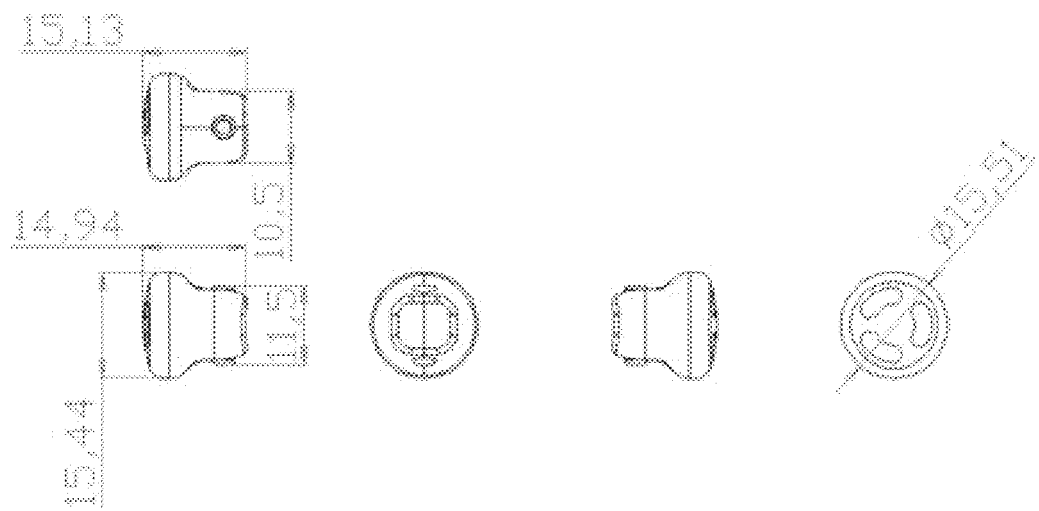
FIG. 5 illustrate a blueprint of the speaker unit in accordance with one embodiment of the present invention.

FIGS. 4A-4E illustrate the various views of the speaker 3. These speakers may be Wenda S2, S3 or J1 speakers. Although FIGS. 4A-4E illustrate the speaker 3 housed within the elastic wristband, it is understood this speaker can be housed within any of the wristbands or bracelet devices described in this application or any wristbands as known in the art. FIG. 4E illustrates the uncovered view of the speaker. FIG. 5 illustrates a blueprint of the speaker showing the unit number measurements of the various components.

Figure 1B:
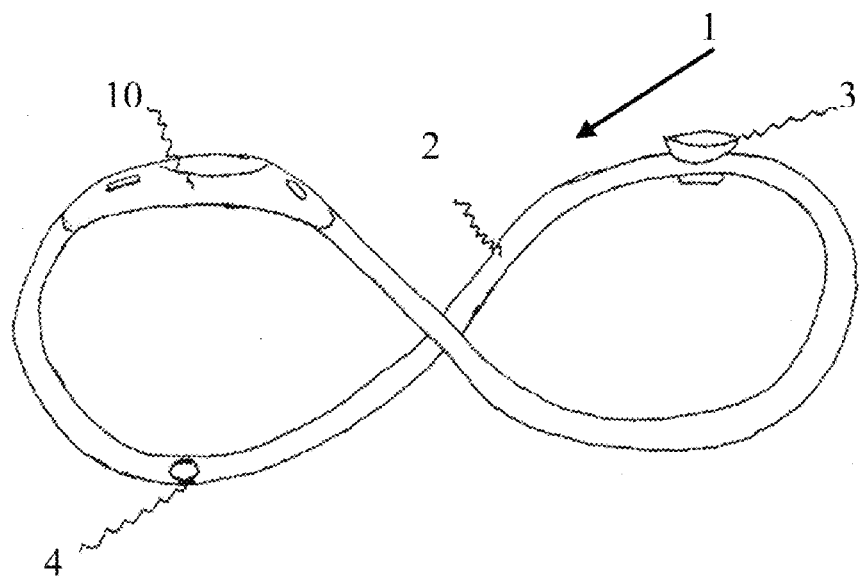
FIG. 1B is a front view of the bracelet device shown in FIG. 1A being twisted into a double loop.

A microphone 4 is tethered in a third, separate position on the wristband 2, as shown in FIGS. 1A and 1B. In an alternate embodiment, the microphone may be housed anywhere on the wristband 2. The microphone can be a Huahaiwang, 2.2 volt, 44+/−3 dB microphone, for example. All components on the wristband combined with the wristband provide a bracelet device 1 for sending and receiving voice messages during a phone call.

The wireless transmitter/receiver 10 can be paired to a mobile phone device (not shown) by emitting signals back and forth between the mobile phone device and the bracelet device 1. The pairing of the mobile phone device and the bracelet device may be performed by any manner, including use of Bluetooth™ technology. Alternatively, the wireless/transmitter receiver 10 can be paired to a mobile phone device capable of playing music or a media player for the purpose of listening to music by using the bracelet device. The specifics of the pairing are known in the art and need not be discussed further.

In one embodiment of the present invention, the wristband 2 can be made from any flexible, elastic, pliable material known in the art. The wristband 2 can be bent and twisted by pinching the middle to form a double or triple loop in order to form a tighter fitting bracelet on a user's wrist. The double loop embodiment of the bracelet device can be shown in FIG. 1B. In this embodiment, the preferred positions of the speaker unit 3, the microphone 4 and the wireless transmitter/receiver 10 are shown, before the bracelet device 1 is placed on a user's wrist.

Figure 6A:
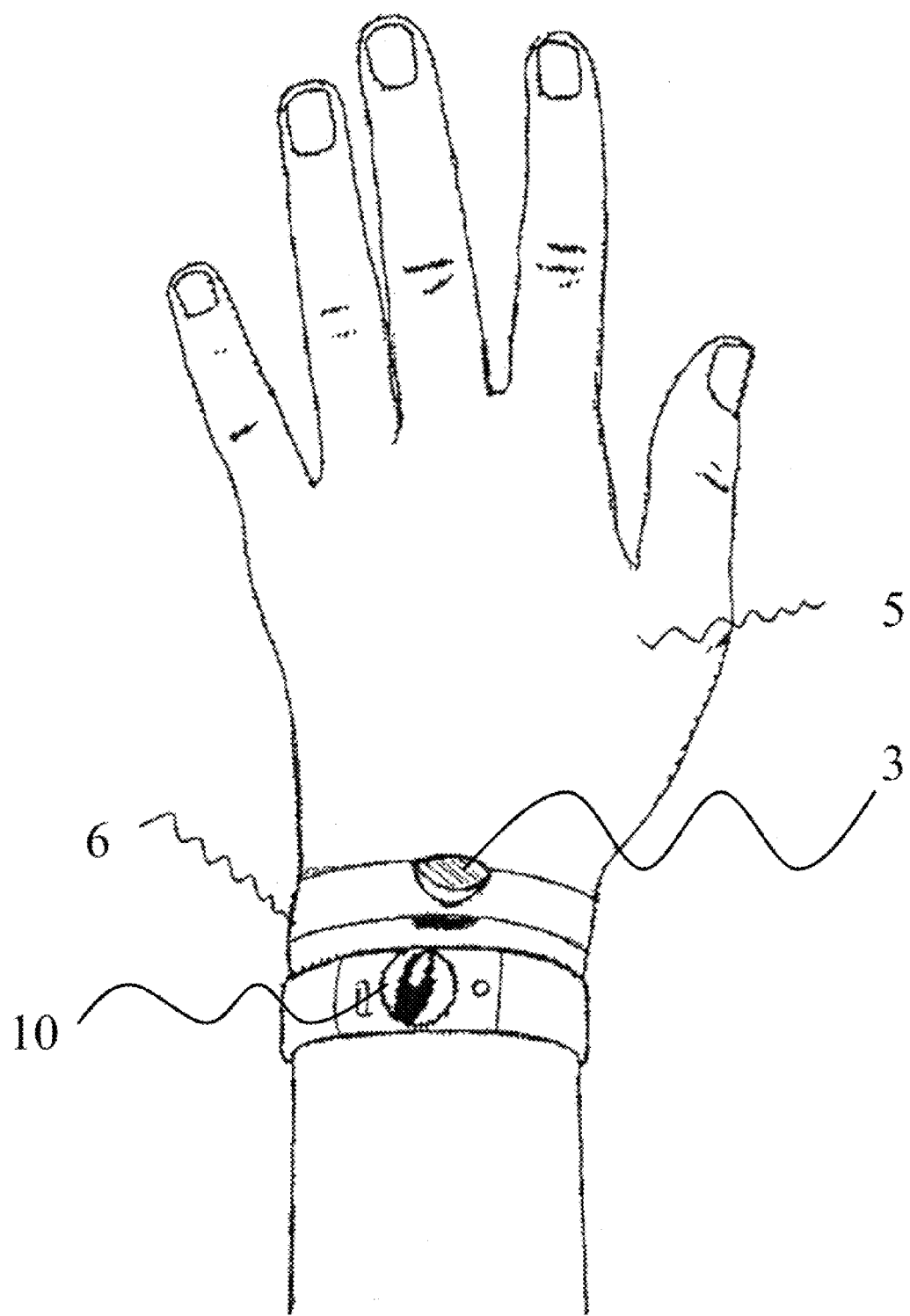
FIG. 6A is a front view of a user wearing the bracelet embodiment of the present invention at a resting position on his/her arm.

In one embodiment of the present invention, a user double loops the wristband 2 in a semi-tight position 6 around his/her arm 5, specifically his/her wrist, as shown in FIG. 6A. The speaker unit 3 and the wireless transmitter/receiver 10 are shown side by side on top of the front of the user's wrist. When the bracelet device is in a resting position on a user's wrist, the speaker unit 3 is in a retracted position. The bracelet device in a resting position appears to be a fashionable piece of jewelry, as shown in FIG. 6A. At this point, the user may have already paired the bracelet device to connect to incoming calls sent to the user's mobile phone. The user can pair the bracelet device at any time.

The components of the bracelet device may be placed on any printed circuit board assembly. In one embodiment, the Lulutong PCBA board model S2, having the following dimensions: 0.8 mm by 16.5 mm by 22 mm may be used. In another embodiment, the Lulutong PCBA board model S3, having the following dimensions: 0.8 mm by 10 mm by 30 mm may be used. In yet another embodiment, the Lulutong PCBA board model J1, having the following dimensions 0.8 mm by 12 mm by 35 mm may be used.

The user may receive an alert of an incoming call in various ways. For example, the user may receive an alert by way of the vibrator housed on the bracelet device emitting a vibration signal. The user may also receive an alert of an incoming call by an indicator displayed on a digital display on the bracelet device. The user may answer the call in one of many ways. In one embodiment, when a user receives an alert of an incoming call, the user may push a button (e.g., a switch, such as a G.S.T. switch 4*4*0.5 250 g), located on the wireless transmitter/receiver 10, to connect to the call. The button may alternatively be located anywhere else on the bracelet device. The user may also connect to the call by pressing a button on the user's mobile device. Alternatively, the user may set a preset mode in order to automatically answer the call. That is, the call may automatically be answered after a preset or predetermined amount of rings or after a preset or predetermined amount of time (e.g., 10 seconds) has passed. Other alternative methods known in the art may be used to connection to the call and need not be discussed further.

Figure 6B:
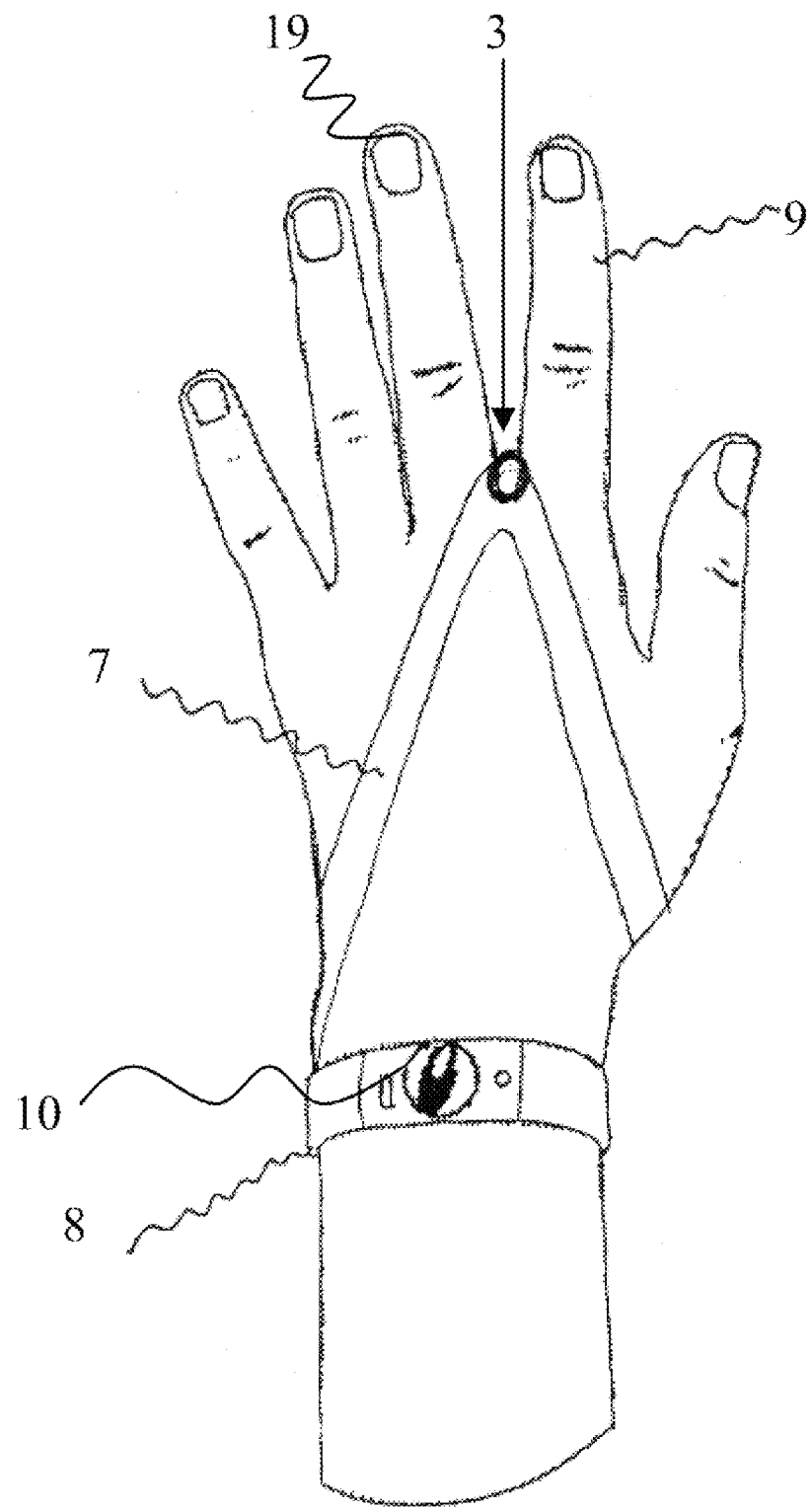
FIG. 6B is a front view of a user wearing the bracelet embodiment of the present invention at a stretched position on his/her hand and wrist where the speaker unit is held between the user's fingers.

In order to communicate (i.e., talk and listen) using the bracelet device, the user grabs the speaker unit 3, being in a separate position on the wristband 2 than the wireless transmitting/receiver 10 casing, and stretches and pulls the speaker unit 3 and the attached portion of the wristband 2 in a position between the user's index finger 9 and middle finger 19, as shown in FIG. 6B. In this exemplary embodiment, the second loop of the wristband 2 houses the tethered speaker unit 3 and the first loop of the wristband 2 can be tightened 8 around the user's wrist and hand to lock the positions of the speaker unit 3, the microphone 4 and the wireless transmitter/receiver 10. This portion of the wristband is shown in a stretched position 7. The user may position the speaker unit 3 anywhere in between the index finger 9 and the middle finger 19 that is comfortable for the user. In a preferred embodiment, the ideal position to place the speaker unit 3 is next to the webbed skin adjoining the two fingers at the base of the fingers, where the fingers connect with the rest of the hand. Of course, other positions can alternatively be used and also, the user may place the speaker unit in between any fingers. The ideal position embodiment is shown in FIG. 6B.

As the speaker unit 3 is pulled towards the user's fingers, the first loop of the wrist band is tightened 8 and causes friction on the user's wrist while the stretched 7 second or third loop containing the speaker unit 3 expands to a distance away from the wireless transmitter/receiver 10 casing. This distance can be, for example, a satisfactory distance away from the wireless transmitter/receiver 10 casing which may emit potentially hazardous radio frequency radiation.

The user can squeeze the index finger 9 and middle finger 19 closer together in order to hold the speaker unit 3 in place. The user can then position his/her arm close to his/her head and cup the speaker to his/her ear in order to optimize the listening position.

In order to speak into the bracelet device, the user utilizes the microphone 4 (not shown in FIG. 6B). In an preferred embodiment of the present invention, the microphone 4 is located on the opposed side of the wireless transmitter/receiver 10 of the wristband 2. That is, the microphone 4 is placed in a third position on the wristband 2 and is preferably placed on the side of the palm of the hand on the underside of the wristband 2 on the inside of the hand (i.e., the front side of the hand). In this way, a user cups the speaker unit 3 in between his fingers and places his/her hand on his/her head so that the speaker unit 3 fits into or close to the user's ear and the microphone 4 is located close to the user's mouth to pick up the user's voice.

Figure 7A:
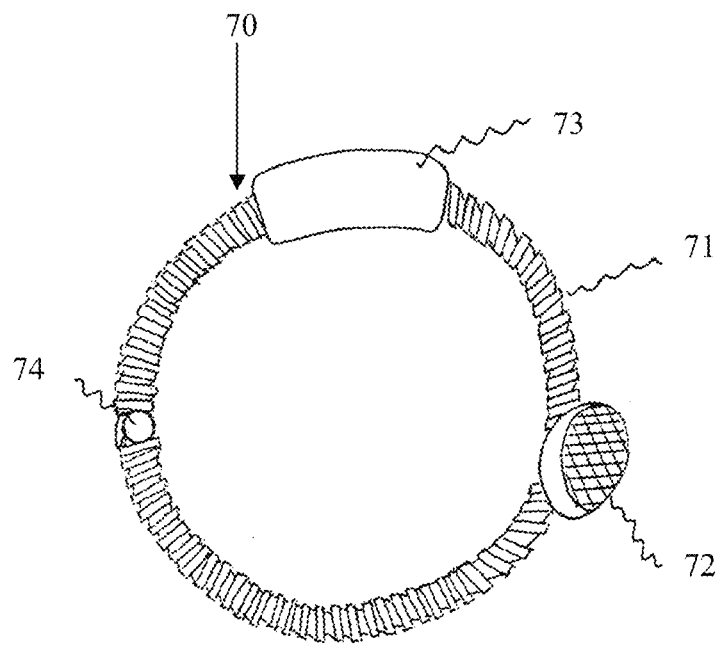
FIG. 7A is a front view of a round, coiled-cord wristband embodiment of the present invention.

FIG. 7A shows an exemplary embodiment of a bracelet device 70 having a spiral-like, coiled cord designed wristband 71. Similar to the bracelet device 1 shown in FIG. 1A and FIG. 1B, the wristband 71 houses a tethered speaker 72, a tethered transmitter/receiver 73 and a tethered microphone 74. The preferred position of these three elements, the speaker 72, the transmitter/receiver 73 and the microphone 74, is shown in FIG. 7A. For example, the microphone 74 can be separated from the transmitter/receiver 73 by 90° and the transmitter/receiver 73 can be separated from the speaker by 90°. All connecting wires are housed within the bracelet.

Figure 8:
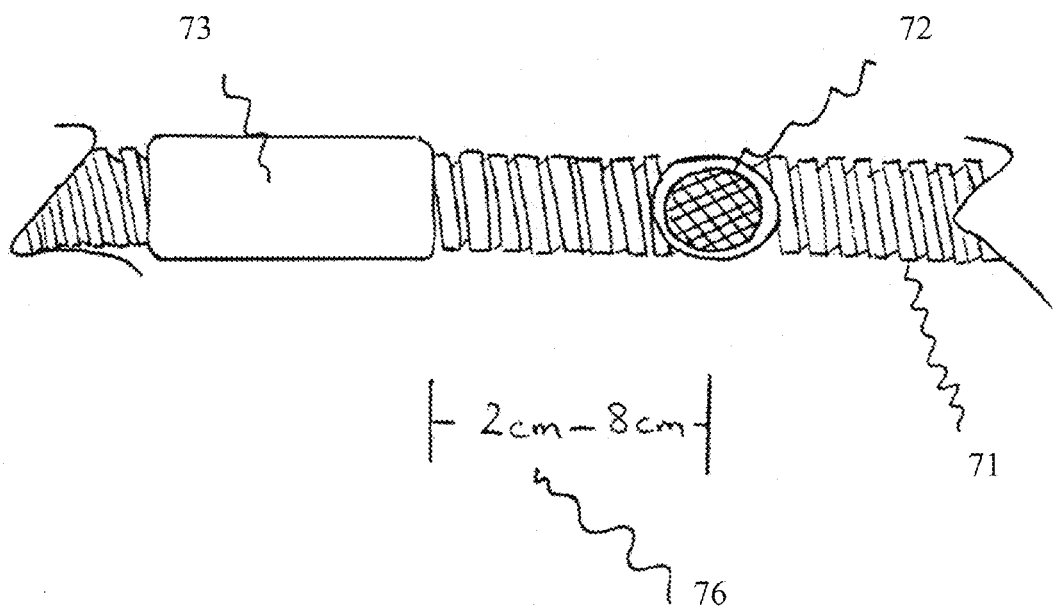
FIG. 8 illustrates a preferred separation distance between the transmitter/receiver and the speaker on the bracelet device, as shown n FIGS. 7A and 7B.

A distance of separation between 2 cm and 8 cm between the transmitter/receiver 73 and the speaker 72 is preferred for use of the bracelet device 70. In terms of angles, the transmitter/receiver is separated from the speaker by an angle between 30° and 150°. The separation of between 2 cm-8 cm is measured when the coiled cord is in a flaccid, non-stretched condition, as shown in FIG. 7A. The separation between 2 cm-8 cm has been found to be ideal because when the separation is outside this parameter, the hazard of radiation may increase at the bottom end of the scale (i.e., 2 cm) and the function above 8 cm causes the cord to become too slack for its expandable function of retracting the speaker. The range of separation, between 2 cm-8 cm, is shown in FIG. 8, reference numeral 76. The preferred distance for separation of the transmitter/receiver 73 and speaker 72 is approximately 5 cm.

Figure 7B:
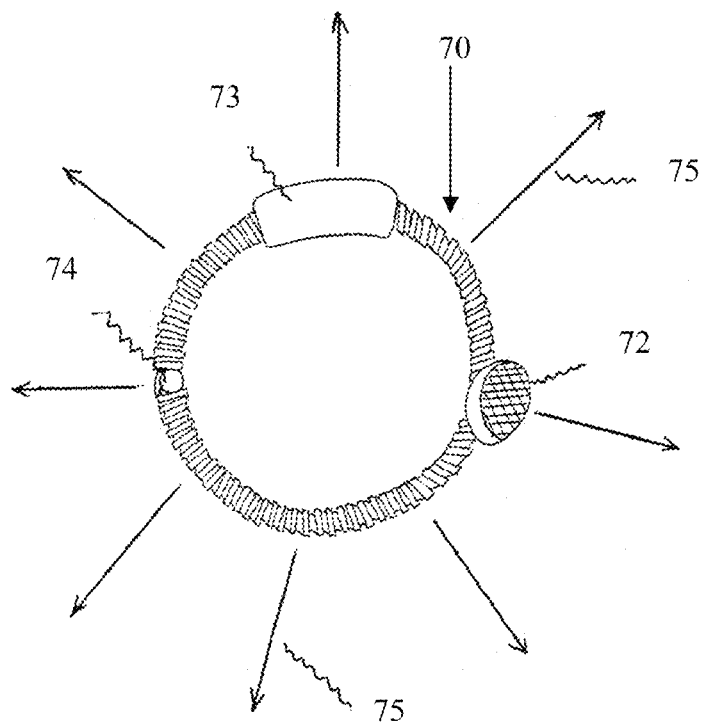
FIG. 7B is a front view of the bracelet device, as shown in FIG. 7A illustrating that it can expand in 360° direction on a flat plane, according to an exemplary embodiment of the present invention.

Starting at a flaccid 5 cm, the cord and speaker 72 can expand up to 28 cm away from the transmitter/receiver 73, which may further reduce the potentially hazardous radiation that may be emitted. As shown in FIG. 7B, the bracelet device 70 can stretch in a 360° direction expansion 75 on a flat plane. Although these positions and separation distances are preferred, they are not meant to limit the present invention in any way. Further, while the illustrations show a rounded coiled cord, modifications in shape and size such as rectangular, elliptical, square or some other shape may be used which does not depart from the spirit or scope of the invention.

Figure 9A:
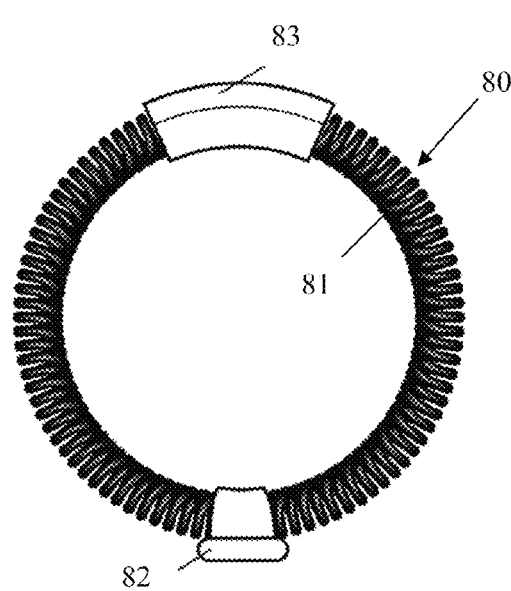
FIGS. 9A-9C illustrate a bracelet device where the transmitter/receiver is separated from the speaker by 180°, in accordance with an ideal and preferred exemplary embodiment of the present invention.
Figure 9B:
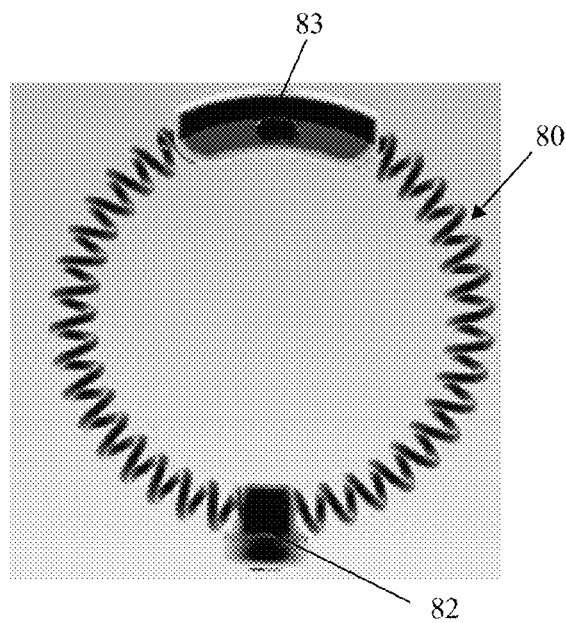
Figure 9C:
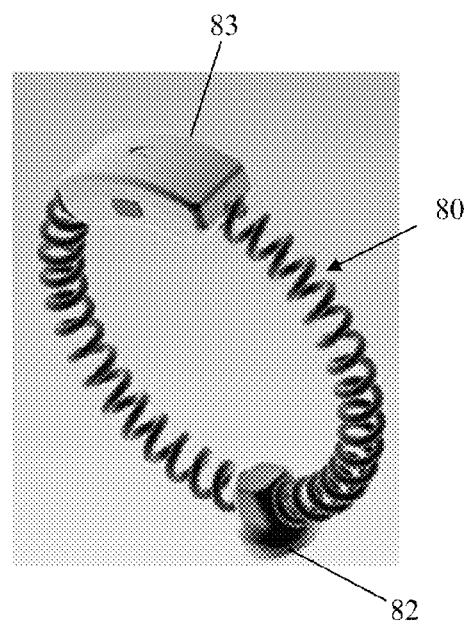

An ideal embodiment of the coiled cord wristband 81 design can be seen in FIGS. 9A-9C. In this embodiment, a bracelet device 80 is shown. This embodiment is similar to the one shown in FIG. 7A, except that the transmitter/receiver 83 is separated from the speaker 82 by 180°. The microphone can be placed any where along the wristband 81 where it can pick up the voice of user wearing the bracelet device. In one embodiment, the microphone is embedded on the transmitter/receiver 83 itself. FIG. 9B illustrates a mirror view of FIG. 9A. FIG. 9C shows another view of the bracelet device 80.

Figure 10A:
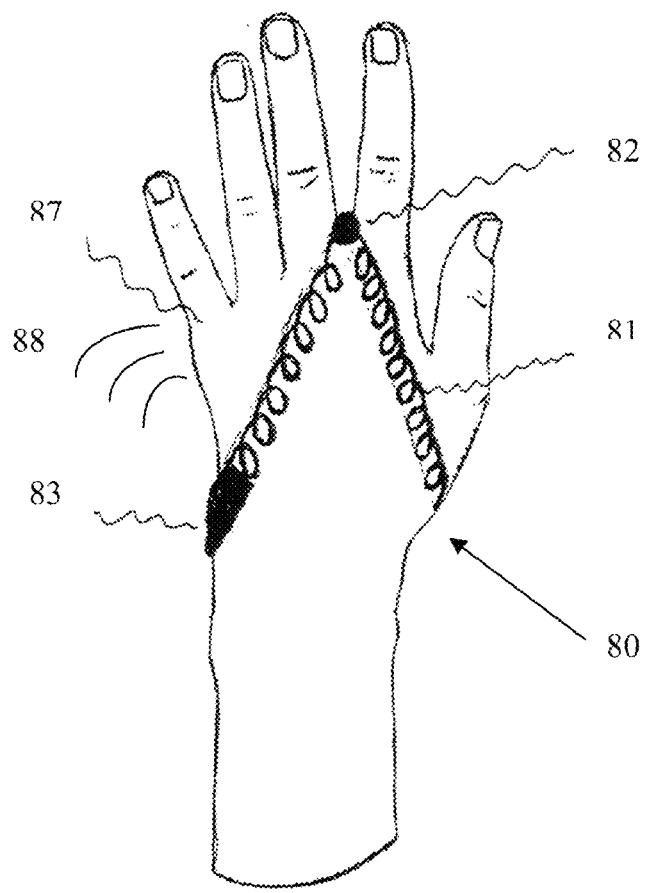
FIGS. 10A-10B illustrates how a bracelet device, shown in FIGS. 7A, 7B, 8, 9A-9C, having a rounded coiled cord wristband may be worn by a user, in accordance with those embodiments of the present invention.
Figure 10B:
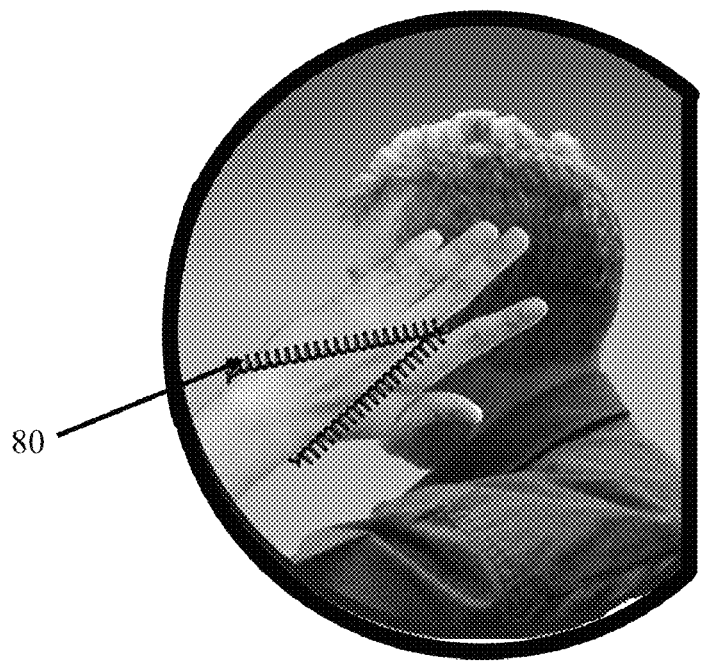

FIG. 10A shows the bracelet device 80 worn on a user's hand 87. When the user receives an incoming call, the vibrator sends a vibration signal 88 that can be felt by the user's hand. The bracelet device may also contain a digital display to alert the user of incoming phone calls. As shown in FIG. 10A, the user stretches the bracelet and extends the speaker 82 in between his/her two fingers. In one embodiment, the transmitter/receiver 83 can be separated from the speaker by approximately 14 cm. This distance may vary dependent on the size of the user's hand. Both the extended distance and hand further shield the user from any potentially harmful electromagnetic radiation that may be emitted by the transmitter/receiver 83. In this embodiment, the microphone is embedded in the transmitter/receiver 83. Alternatively, the microphone can be located anywhere along the wristband 81 where it can pick up the user's voice. As shown in FIG. 10B, the user holds up the bracelet device 80 up to his ear.

Figure 11:
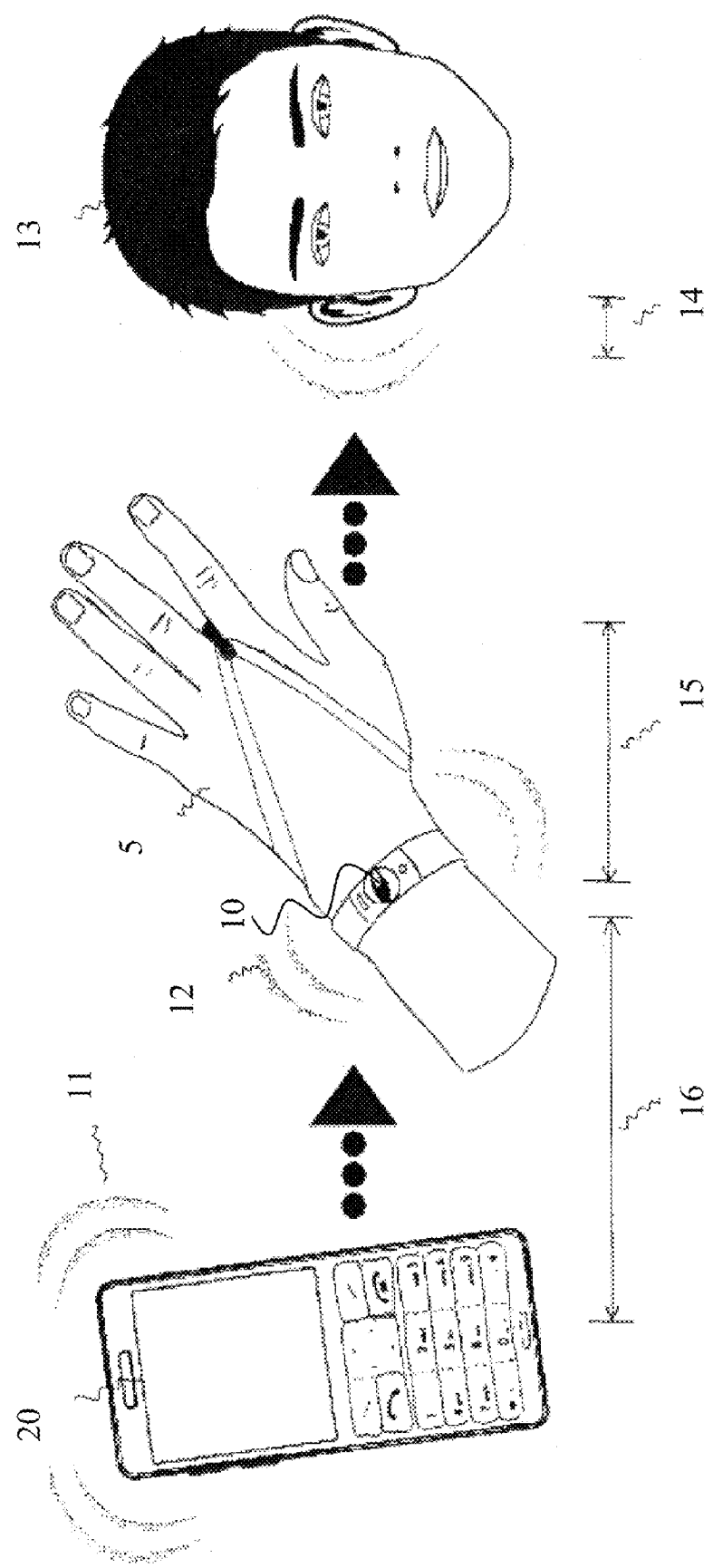
FIG. 11 illustrates a scenario of a user using the bracelet device of FIGS. 6A and 6B to communicate through a mobile phone and the preferred distances according to an exemplary embodiment of the present invention.

A scenario of how the bracelet device 1 is used is described in FIG. 11. Although FIG. 11 illustrates a scenario showing the bracelet device 1 having an elastic wristband, it is understood that the coiled cord wristbands shown in FIG. 7A and FIG. 9A can easily be substituted for the elastic wristband without changing the spirit and scope of the present invention.

The mobile phone 20 transmits wireless signals 11 to the wireless transmitter/receiver 10 on the bracelet device. The mobile phone 20 can be any kind of phone adapted to operate on one or many networks. For example, the mobile phone 20 can be a cellular phone connected to a cellular network or a mobile phone connected to a public switched telephone network (PSTN) or voice over Internet Protocol (VoIP) network. The wireless signals 11 transmitted to the wireless transmitter/receiver 10 can be coded using any technology. The transmission of the wireless signals 11 can be for the purpose of pairing the bracelet device 1 with the mobile phone 20, communicating with the bracelet device during a live call, or at any other time. The bracelet device can be paired with a plurality of devices and phones.

The wireless transmitter/receiver 10 sends wireless signals 12 back to the mobile phone 20. These signals can be sent in order to pair the bracelet device with the mobile phone or for other purposes.

The measurements shown by reference numerals 14, 15 and 16 in FIG. 11 include the preferred, relative distances of the stretched 7 wristband from the user's head 13, the distance of the speaker unit 3 from the wireless transmitter/receiver 10 and the distance from the mobile phone 20 to the wireless transmitter/receiver 10, respectively. These distances allow shielding of the user's head from wireless signals 11 and 12. In one embodiment, the preferred distances 14, 15 and 16 minimize harmful radiation from entering the user's head 13. Preferably, the distance 15 is 12 cm. The separated parts and position of the arm further shield the user's head from harmful radiation.

To send and receive phone calls (i.e., outgoing and incoming calls, respectively), wireless signals 11 and 12 are transmitted and received between the mobile phone 20 and the wireless transmitter/receiver 10. The transmission and reception of wireless signals 11 and 12 are known in the art and need not be further discussed. When the mobile phone 20 receives an incoming call, a wireless signal can be transmitted to the paired bracelet device. A vibration signal can be transmitted from the vibrator (not shown) located inside the wireless transmitter/receiver 10 casing. This vibration signal alerts a user for example, of an incoming call. Prior to receiving the vibration signal, the user is wearing the bracelet device in a resting position, as shown in FIG. 6A. When the user is alerted of the incoming call (i.e., when the bracelet device vibrates), the user connects to the call (i.e., by pressing a button, located for example on the transmitter/receiver) or the call is automatically answered (i.e., after a preset amount of rings or predetermined period of time) and the user stretches the second loop of the wristband in order to grip and hold the speaker unit 3 in between two of the user's fingers/thumb, as shown in FIG. 6B. The first loops tightens, as shown in FIG. 6B, reference numeral 8, fixing and aligning the positions of the speaker unit 3, the microphone 4 and the transmitter/receiver 10. The preferred alignment is shown in FIG. 6B. In this way, the microphone 4 (not shown) is placed on the underside (i.e., the front side of the hand or the side of the palm of the hand) of the wrist when the user speaks to the calling party. To speak to the calling party, the user speaks into the microphone and the microphone transmits a voice signal to the transmitter/receiver 10, which is then wirelessly sent to the paired mobile phone 20. As described above, the user listens to the calling party through the earpiece unit held in between his/her fingers. The user communicates (i.e., talks to and listens to the calling party) in this way. When the user disconnects from the call (i.e., by pushing a button or waiting for the calling party to hang up the call), the user opens the closely-held two fingers holding the speaker unit 3, and releases the speaker unit 3. This movement automatically retracts both the speaker unit 3 and the stretched portion of the wristband 2 to it's original memory (i.e., a semi-tight position 6 as shown in FIG. 6A). In case the wristband was triple looped, after completion of the call when the user releases the speaker unit 3, the wristband returns to a resting position in a triple loop.

In an alternate embodiment, the user communicates using the bracelet device 70, shown in FIGS. 7A, 7B and 8 or bracelet device 80, shown in FIGS. 9A-9C and 10. Similar to the description in FIG. 11, when a mobile phone receives an incoming call, a wireless signal can be transmitted to the paired bracelet device. This vibration signal alerts a user for example, of an incoming call. Prior to receiving the vibration signal, the user is wearing the bracelet device in a resting position, as shown, for example, in FIGS. 7A, 7B and 9A-9C. When the user is alerted of the incoming call (i.e., when the bracelet device vibrates), the user connects to the call (i.e., by pressing a button, located for example on the transmitter/receiver) or the call is automatically answered (i.e., after a preset amount of rings or predetermined period of time) and the user stretches the wristband in order to grip and hold the speaker unit 82 or 72 in between two of the user's fingers/thumb, as shown in FIGS. 10A-10B. In this way, the microphone (not shown) is placed on the underside (i.e., the front side of the hand 87 or the side of the palm of the hand) of the wrist when the user speaks to the calling party. The microphone can be located anywhere on the wristband where it can pick up the voice of the user. To speak to the calling party, the user speaks into the microphone and the microphone transmits a voice signal to the transmitter/receiver 83 or 73, which is then wirelessly sent to the paired mobile phone. As described above, the user listens to the calling party through the earpiece unit held in between his/her fingers. The user communicates (i.e., talks to and listens to the calling party) in this way. When the user disconnects from the call (i.e., by pushing a button or waiting for the calling party to hang up the call), the user opens the closely-held two fingers holding the speaker unit 82 or 72, and releases the speaker unit. This movement automatically retracts both the speaker unit and the stretched portion of the wristband to it's original, single-loop position (i.e., as shown in FIGS. 7A, 7B and 9A-9C.).

Figure 12:
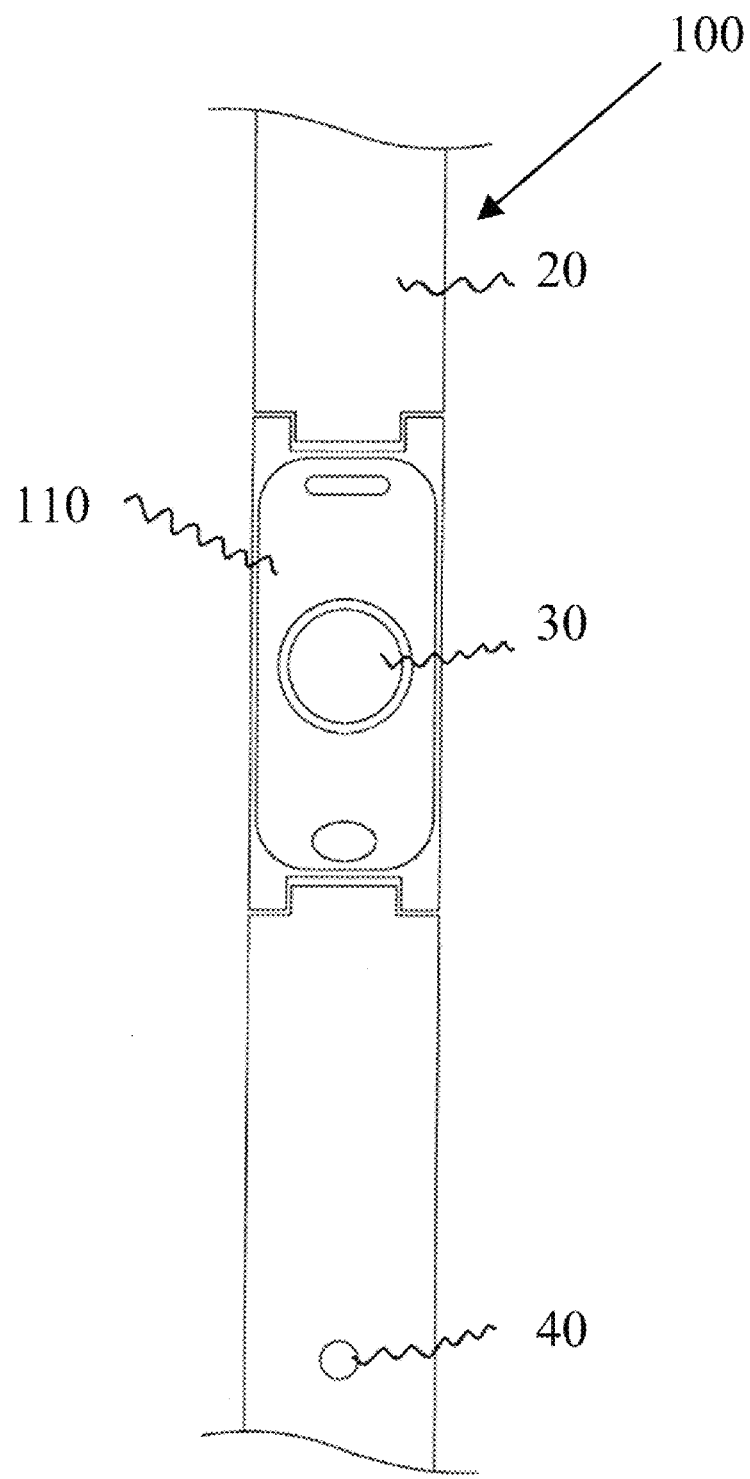
FIG. 12 is a top, partial view of the combined wireless transmitter/receiver of FIGS. 6A and 6B with a retractable speaker attached to wristband according to an exemplary embodiment.

In another embodiment of the present invention, as shown in FIG. 12, a wristband 20 houses a wireless transmitter/receiver 110 which is coupled to a retractable speaker 30 attached to a retractable speaker cord (not shown) and a microphone 40, located on the opposite side (i.e., 180°), from the retractable speaker 30. The microphone 40 may alternatively be placed anywhere on the wristband 20 where it can pick up the voice of the user. The angle formed between the transmitter/receiver and the microphone may vary on a given plane. The retractable speaker cord can be the audio cord (e.g., a Wenda audio cord) connecting the speaker to the transmitter/receiver. In a preferred embodiment, the wireless transmitter/receiver 110 and the retractable speaker 30 are combined into one single device component. These components form the bracelet device 100.

Figure 13:
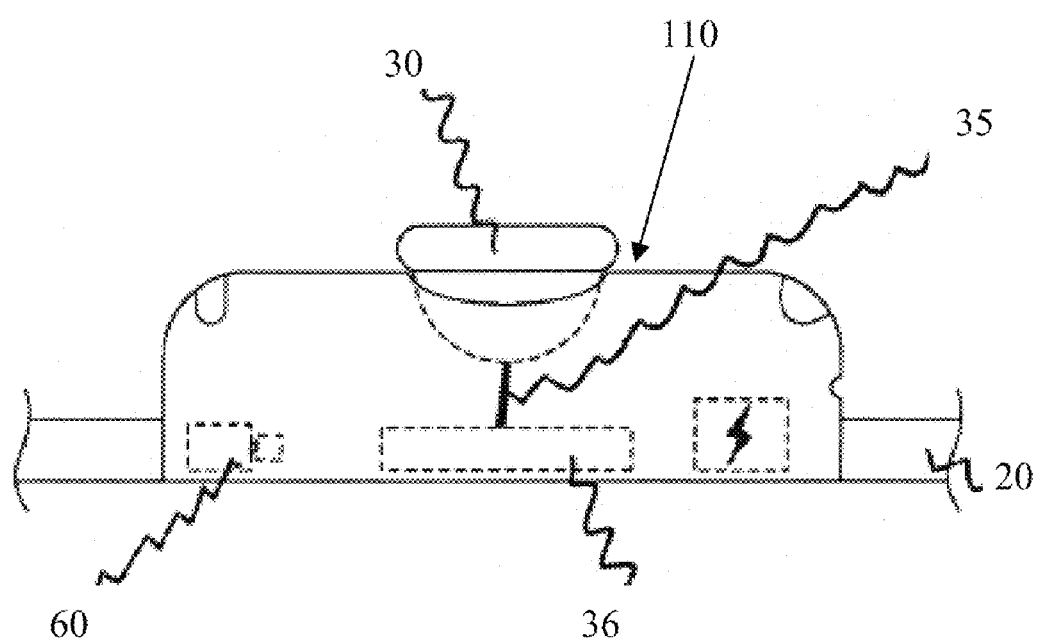
FIG. 13 is a front view on a larger scale of the components of the transmitter/receiver of FIG. 12 including the retractable speaker unit components and a vibrator, shown in phantom, according to an exemplary embodiment.

The components of the wireless transmitter/receiver 110 are shown in detail in FIG. 13. The retractable speaker 30 can be connected to a retractable spring coil 36 by the tethered wired cord 35. The retractable speaker 30 and wired cord 35 housed within the wireless transmitter/receiver 110 can be pulled out by a user. When a user pulls the retractable speaker 30 in an upward position away from the wristband 20, the wired cord 35 can be unwound from the retractable spring coil 36. The user may pull the retractable speaker 30 for a number of reasons. For example, the user may pull the retractable speaker 30 for the purpose of answering an incoming call after the successful pairing of the bracelet device 100 with a user's mobile phone. The user may wish to pull the retractable speaker 30 up to his/her ear for the purpose of listening to the incoming voice data. When the user wishes to disconnect from the call or if the call has already been disconnected, the retractable spring coil 36 winds the wired cord 35 and automatically pulls the retractable speaker 30 back into the wireless transmitter/receiver 110 housing at a resting position. The specific method describing how the user connects to/disconnects from a call will be described in reference to FIG. 15.

Figure 14A:
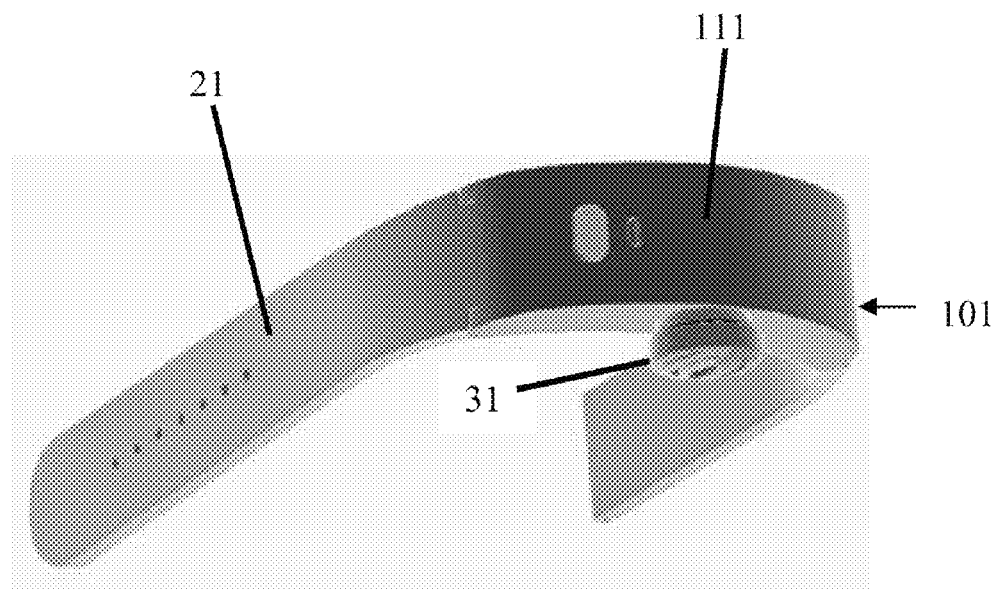
FIGS. 14A-14G illustrate different views of a bracelet device in accordance with an exemplary embodiment of the present invention.
Figure 14B:
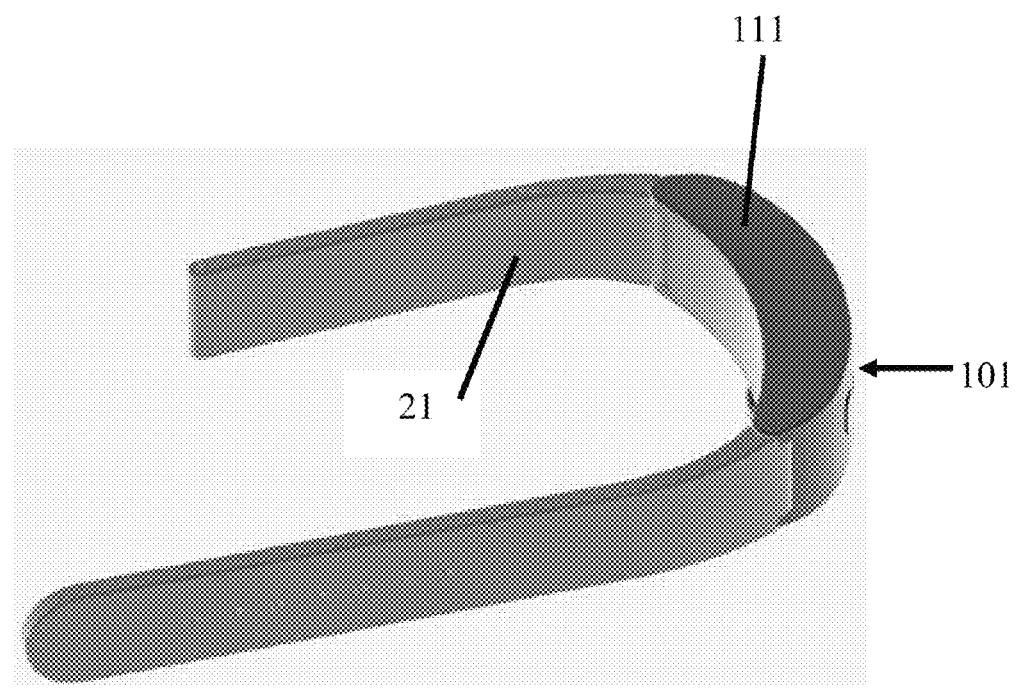
Figure 14C:
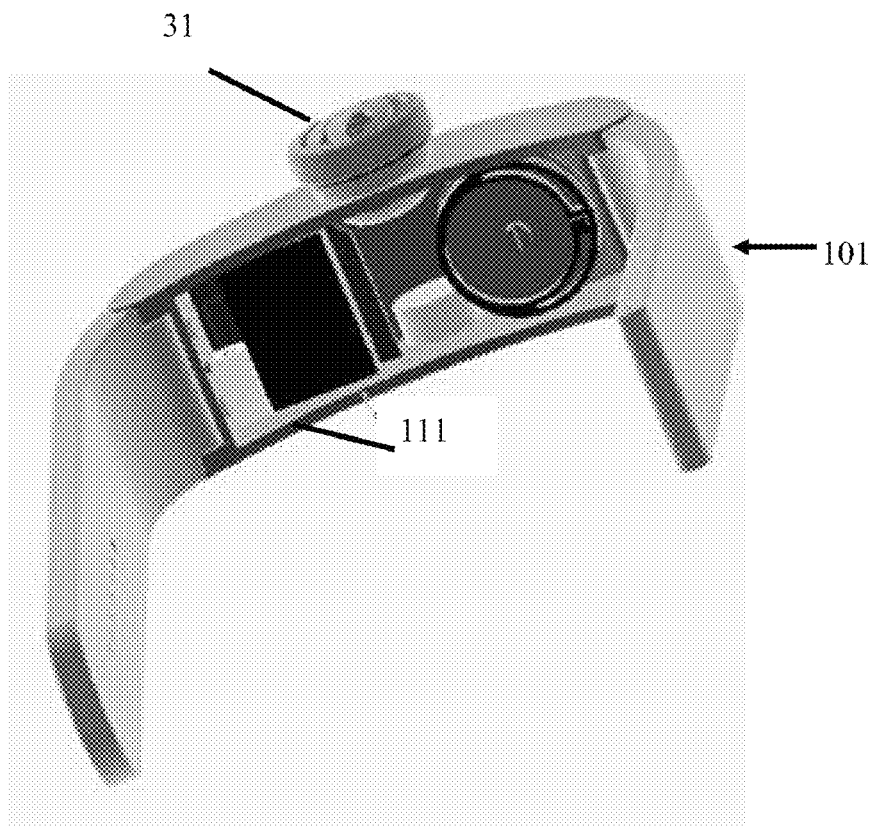
Figure 14D:
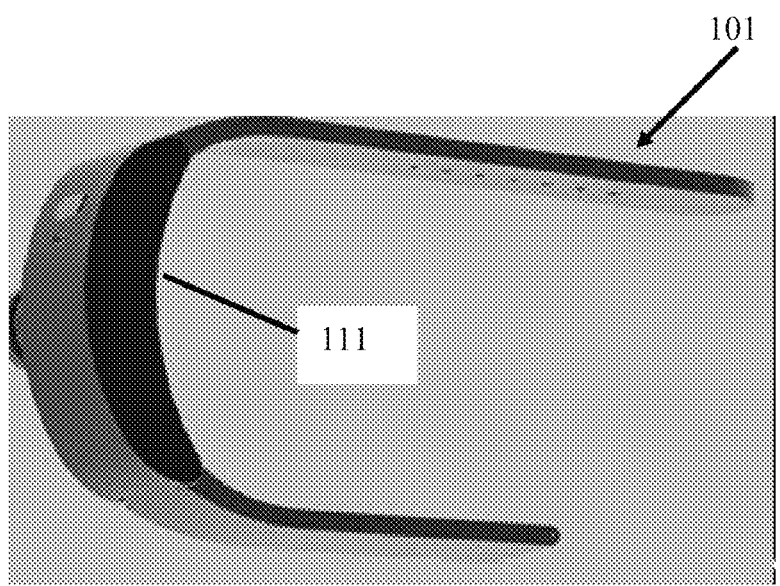
Figure 14E:
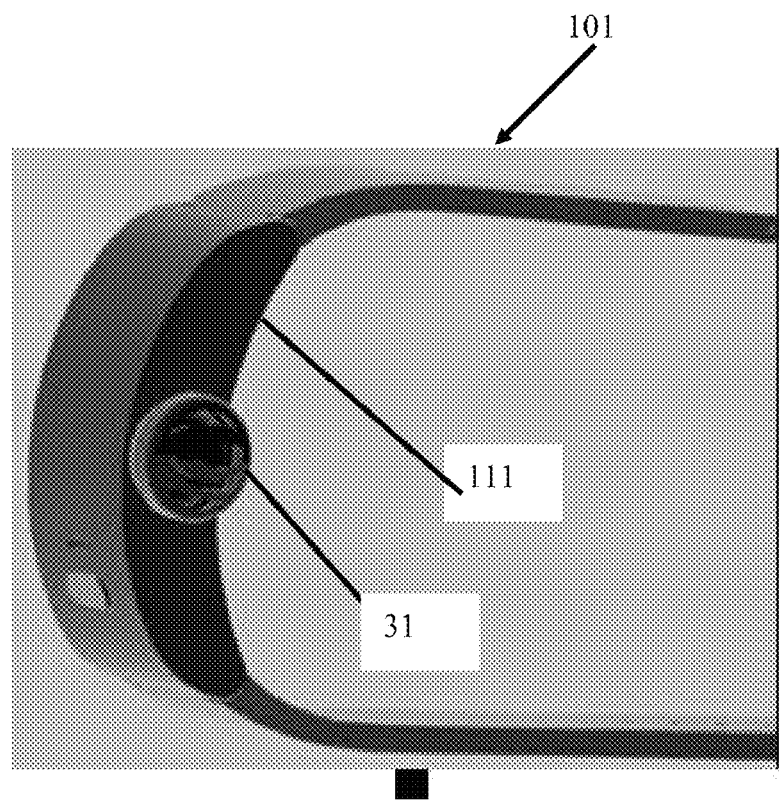
Figure 14F:
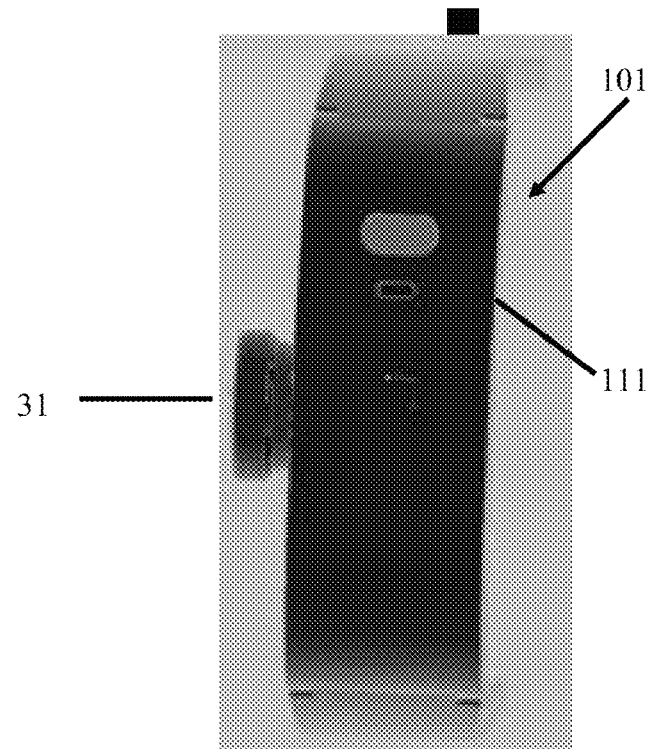
Figure 14G:
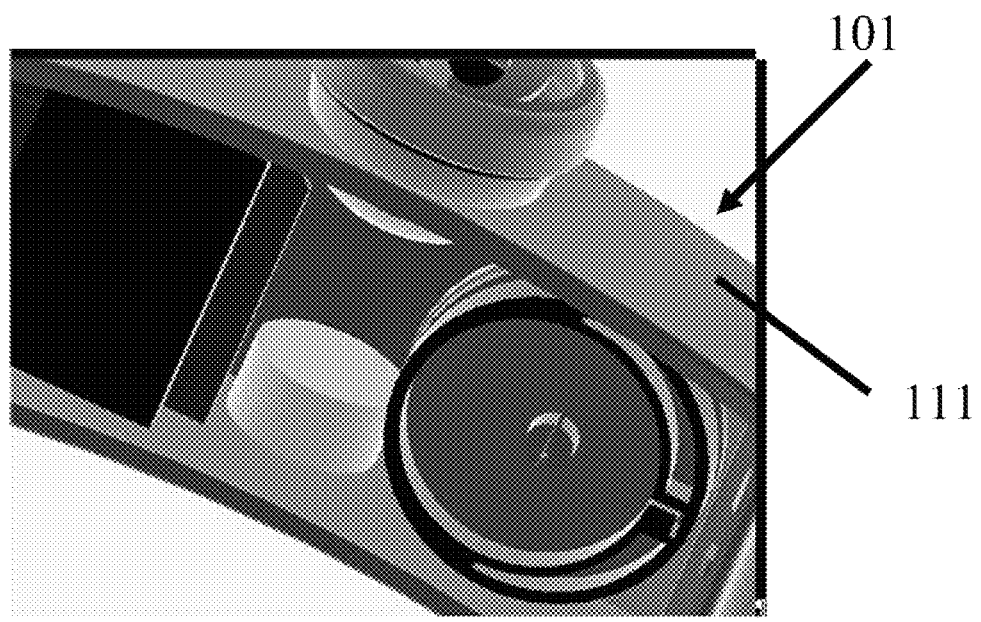

FIGS. 14A-14G illustrate an exemplary bracelet device 101 being similar to the bracelet device 100 shown in FIGS. 12 and 13. One difference between the bracelet device 101 and the bracelet device 100 is that in the speaker unit 31 is placed underneath the front of the wristband 21 and is positioned at an angle 90° from the front of the wristband 21 and the face of the wireless transmitter/receiver 111 unit. Various views, including an exposed back-view of the bracelet device 101 as shown in FIG. 14C, are shown in FIGS. 14A-14G. Similar to the bracelet device 100, as shown in FIGS. 12 and 13, a user can utilize the bracelet device 101 to send and receive phone calls (i.e., outgoing and incoming calls, respectively). The user pairs the bracelet device with the cell phone and the bracelet device housing the retractable speaker 31 remains in a resting position, as shown in FIG. 14A.

Figure 15:
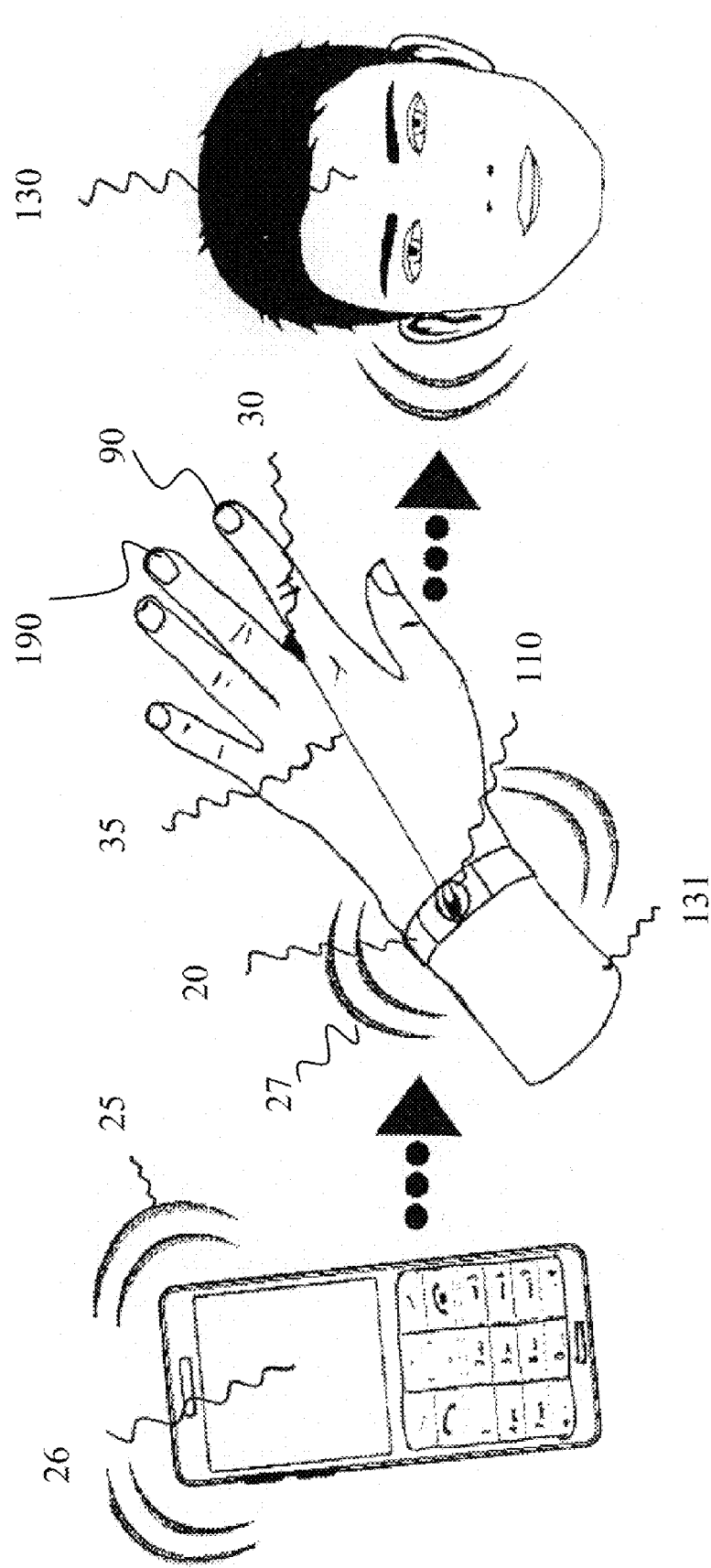
FIG. 15 illustrates a scenario of a user using the bracelet device of FIG. 12, according to an exemplary embodiment, to communicate through a mobile phone.

Although FIG. 15 illustrates the bracelet device 100 shown in FIGS. 12 and 13, it is understood that the bracelet device 101, shown in FIG. 14A-14G may be substituted without departing from the spirit and scope of the present invention.

For example, the only variation between the bracelet device 101 and the bracelet device 100 is the positioning of the speaker.

As shown in FIG. 15, a user sends and receives voice data to a mobile phone 26 by using the bracelet device. The mobile phone 26 transmits wireless signals 25 to the wireless transmitter/receiver 110, which is part of the bracelet device. The mobile phone 26 can be any kind of phone adapted to operate on one or many networks. For example, the mobile phone 26 can be a cellular phone or a mobile phone connected to a public switched telephone network (PSTN) or voice over internet protocol (VoIP) network. The wireless signals 25 transmitted to the wireless transmitter/receiver 110 can be coded using any technology. The transmission of the wireless signals 25 can be for the purpose of pairing the bracelet device 100 with the mobile phone 26, communicating with the bracelet device during a live call, or at any other time. The bracelet device can be paired with a plurality of devices and phones.

The wireless transmitter/receiver 110 sends wireless signals 27 back to the mobile phone 26. These signals can be sent in order to pair the bracelet device with the mobile phone or for other purposes.

To send and receive phone calls (i.e., outgoing and incoming calls, respectively), wireless signals 25 and 27 are transmitted and received back and from between the mobile phone 26 and the wireless transmitter/receiver 110. The transmission and reception of wireless signals 25 and 27 are known in the art and need not be further discussed. In one embodiment, a user pairs the bracelet device with the cell phone and the bracelet device housing the retractable speaker 30 remains in a resting position, as shown in FIG. 12. In an alternate embodiment, the retractable speaker can be placed anywhere and at any angle on the transmitter/receiver. For example, the retractable speaker may be positioned on the side of the transmitter/receiver (as shown for example in FIGS. 14A-14G) as opposed to being located on top of the transmitter/receiver. When the mobile phone 26 receives an incoming call, a wireless signal is transmitted to the paired bracelet device. A vibration signal is transmitted from the vibrator (FIG. 13, reference numeral 60) located inside the wireless transmitter/receiver 110 casing. This vibration signal alerts a user of an incoming call or message, for example. Prior to receiving the vibration signal, the user is wearing the bracelet device in a resting position, as shown in FIG. 6A. Alternatively, the user may be alerted of an incoming call or message by an indicator shown on a digital display. When the user is alerted of the incoming call, the user can choose to connect to the call. There are several methods by which the user can choose to connect to the incoming call. In one embodiment, the user my connect to the call and communicate via the mobile phone 20 by pulling on the retractable speaker 30, which causes the wired cord 35 to uncoil from the retractable spring coil 36 and become exposed. The pulling of the wired cord triggers a connection (e.g., via a switch) which connects the bracelet device to the mobile phone to send and receive voice data by using Bluetooth™ technology. Alternatively, the user may connect to the calling party by pushing a button on the bracelet device or pushing a button on the mobile phone. In another embodiment, the call can be connected without the user interfering after a predetermined number of time or preset number of rings. The user then places the retractable speaker 30 in between his/her index finger 90 and the middle finger 190. The preferred position of the retractable speaker 30 placed between the user's fingers on the user's hand 131 is shown by the center drawing in FIG. 15. That is, the retractable speaker 30 is placed ideally next to the webbed skin adjoining the two fingers, 90 and 190, at the base of the fingers, where the fingers connect with the rest of the hand. At this point, the retractable speaker 30 is in a stretched position. Of course, other positions can alternatively be used and also, the user may place the speaker unit in between any fingers or thumb.

The user then bring his/her hand close to his/her head 130 and cups his/her ear. The user can now hear the calling party via the retractable speaker 30 placed inside or close to his/her ear when signals are wirelessly passed from the mobile phone 26 to the wireless transmitter/receiver 110 housed on the bracelet device.

To send signals back to the calling party (i.e., talk back), the user can speak into the microphone 40 (not shown) embedded to the wristband 20. In a preferred embodiment, the microphone 40 can be located on the opposed side of the transmitter/receiver 110 (i.e., on the front side of the user's wrist, on the side of the palm of the hand). The voice signal sent from the user can be transmitted through an embedded wire in the wristband to the transmitter/receiver 110, which is then wirelessly sent to the paired mobile phone 26.

In this way, the microphone is placed on the underside of the hand (not shown) and held near the mouth of the user when the user speaks back to the calling party. As described above, the user listens to the calling party through the speaker held in between his/her fingers. The user communicates (i.e., talks to and listens to the calling party) in this way. In one embodiment of the present invention, any dangerous, invisible radiation emitted from either the mobile phone or transmitter/receiver is at a distance from the user's head 130 and the effects of radiation are lessened by using the wired cord 35 to distance the speaker 30 which can be held close to the user's head 130 from the transmitter/receiver 110. The user can disconnect from the call in several ways. For example, the user can push a button on the bracelet device or mobile phone or wait for the calling party to hang up the call. In a preferred embodiment, the user opens the closely-held two fingers holding the speaker unit 30, and releases the speaker unit 3. This movement automatically rewinds the wired cord 35 back into the housing of the transmitter/receiver 110 on the wristband by using the retractable spring coil. The rewinding of the wired cord can automatically transmit a signal (e.g., via a switch) to end the call. At this point, the retractable speaker 30 returns to its original memory/resting position, as shown in FIGS. 12 and 13.

An advantage of the present invention is that while the user is engaging in a voice conversation, the bracelet device and stretched, coiled speaker are held close to the head in a fashionable and ordinary manner, the same way that mobile phones are held to the head, but with decreased effects of radiation. The user can listen to the calling party through the retractable speaker and speak into the microphone embedded within the wristband while the user's mobile device remains in a remote location (e.g., the user's pocket or handbag).

Now that embodiments of the present invention have been shown and described in detail, various modifications and improvements thereon will become readily apparent to those skilled in the art. Accordingly, the exemplary embodiments of the invention, as set forth above, are intended to be illustrative, not limiting. The spirit and scope of the present invention is to be construed broadly and limited only by the appended claims, and not by the foregoing specification.

What is claimed is:

1. A bracelet adapted to be paired to a mobile device comprising:

a wristband made of an elastic material, the wristband having a unitary structure comprising:

a speaker portion disposed at a first position;

a wireless transmitter/receiver portion disposed at a second position and coupled to the speaker portion;

at least the speaker portion of the wristband adapted to be in a resting state and at least the speaker portion of the wristband adapted to be in a tensioned, stretched state when tension is applied to at least the speaker portion of the wristband, wherein when the tension of at least the speaker portion of the wristband is alleviated, the speaker portion returns to the first position in the resting state due to the elasticity of the wristband.

2. The bracelet of claim 1, wherein the wristband further comprises a microphone portion disposed at a third position or at the wireless transmitter/receiver portion.

3. The bracelet of claim 2 wherein the microphone portion comprises a microphone and the speaker portion comprises a speaker.

4. The bracelet of claim 1 wherein the wristband is adapted to be held in a fixed position while the speaker portion is in a resting state and the wristband is adapted to return to the resting position automatically upon release of the tension.

5. The bracelet of claim 1 wherein the wireless transmitter/receiver portion includes a vibrator.

6. The bracelet of claim 1 wherein the wristband is comprised of one of:

an expandable coiled cord material; or an elastic material.

7. The bracelet of claim 6 wherein the wristband is comprised of expandable coiled cord material, the expandable coiled cord material being expandable in a 360° direction.

8. The bracelet of claim 6 wherein the wristband is comprised of expandable coiled cord material, the expandable coiled cord material comprising a separation distance between the wireless transmitter/receiver portion and the speaker portion between 2 cm and 8 cm when at least the speaker portion of the wristband is in a resting state.

9. A retractable speaker unit housed within a wristband adapted to be paired to a mobile device comprising:

a retractable speaker;

a coiled spring coupled to the retractable speaker, wherein the retractable speaker is in a first, stretched state when the coiled spring extends and uncoils a wire connecting the retractable speaker and the coiled spring and the retractable speaker is in a second, resting state when the coiled spring recoils the wire connecting the retractable speaker and coiled spring; wherein the retractable speaker is in the first stretched state when the mobile device communicates data to the retractable speaker unit;

the retractable speaker is adapted to automatically go from the first, stretched state to the second, resting state upon the retractable speaker being released from the first, stretched state; and upon the retractable speaker going from the first, stretched state to the second, resting state a switch is triggered that transmits a signal to disconnect at least a portion of the data communication between the mobile device and the retractable speaker unit.

10. The retractable speaker unit of claim 9 wherein the retractable speaker goes from the second, resting state to the first, stretched state in response to at least one of:

a vibration signal sent from a vibration device; and an indicator displayed on a digital display.

11. A wristband adapted to be paired to a mobile device comprising:

a wireless transmitter/receiver comprising a retractable speaker, coupled to a retractable speaker cord, housed on the wireless transmitter/receiver;

a coiled spring coupled to the retractable speaker, wherein the retractable speaker is in a first, stretched state when the coiled spring extends and uncoils a wire connecting the retractable speaker and the coiled spring and the retractable speaker is in a second, resting state when the coiled spring recoils the wire connecting the retractable speaker and coiled spring; wherein the retractable speaker is in the first stretched state when the mobile device communicates data to the retractable speaker unit;

the retractable speaker is adapted to automatically go from the first, stretched state to the second, resting on the retractable speaker being released from the first, stretched state; and upon the retractable speaker going from the first, stretched state to the second, resting state a switch is triggered that transmits a signal to disconnect at least a portion of the data communication between the mobile device and the retractable speaker unit.

* * * * *